United States Patent
Nonaka et al.

(10) Patent No.: US 9,242,892 B2
(45) Date of Patent: *Jan. 26, 2016

(54) GLASS FIBERS HAVING NON-CIRCULAR CROSS SECTIONS, AND FIBER-REINFORCED RESIN COMPACT USING SAME

(71) Applicant: NITTO BOSEKI CO., LTD., Fukushima-shi, Fukushima (JP)

(72) Inventors: Takashi Nonaka, Fukushima (JP); Tsunefumi Aizawa, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/362,443

(22) PCT Filed: Dec. 4, 2012

(86) PCT No.: PCT/JP2012/081402
§ 371 (c)(1),
(2) Date: Jun. 3, 2014

(87) PCT Pub. No.: WO2013/084895
PCT Pub. Date: Jun. 13, 2013

(65) Prior Publication Data
US 2014/0343211 A1    Nov. 20, 2014

(30) Foreign Application Priority Data

Dec. 6, 2011 (JP) .................................. 2011-267374

(51) Int. Cl.
| | |
|---|---|
| C03C 13/00 | (2006.01) |
| C03C 3/087 | (2006.01) |
| C08K 7/14 | (2006.01) |
| C03C 14/00 | (2006.01) |
| C03C 25/10 | (2006.01) |
| B29C 45/00 | (2006.01) |

(52) U.S. Cl.
CPC .............. *C03C 13/006* (2013.01); *C03C 3/087* (2013.01); *C03C 13/00* (2013.01); *C03C 14/008* (2013.01); *C03C 25/1095* (2013.01); *C08K 7/14* (2013.01); *B29C 45/0005* (2013.01); *Y10T 428/2973* (2015.01); *Y10T 428/2976* (2015.01)

(58) Field of Classification Search
CPC .... C03C 13/00; C03C 13/006; C03C 14/008; C03C 3/087; C03C 25/1095; B29C 45/0005; Y10T 428/2976; Y10T 428/2973
See application file for complete search history.

(56) References Cited

U.S. PATENT DOCUMENTS

| | | | |
|---|---|---|---|
| 8,841,222 B2 * | 9/2014 | Nonaka et al. ................... | 501/35 |
| 2011/0000263 A1 | 1/2011 | Hoffmann et al. | |
| 2011/0039681 A1 | 2/2011 | Lecomte | |
| 2012/0095149 A1 * | 4/2012 | Sawanoi et al. ............... | 524/494 |
| 2013/0137565 A1 | 5/2013 | Druart et al. | |

FOREIGN PATENT DOCUMENTS

| | | |
|---|---|---|
| EP | 0 246 620 B1 | 11/1987 |
| EP | 2354104 A1 | 8/2011 |
| EP | 2354105 A1 | 8/2011 |
| JP | 58-064243 A | 4/1983 |
| JP | 04-062109 A | 2/1992 |
| JP | 2003-171143 A | 6/2003 |
| JP | 2006-045390 A | 2/2006 |
| JP | 2009-514773 A | 4/2009 |
| JP | 2009286686 A * | 12/2009 |
| JP | 2010-094896 A | 4/2010 |
| WO | 2007/055968 A2 | 5/2007 |
| WO | WO 2011155362 A1 * | 12/2011 |

OTHER PUBLICATIONS

Machine Translation of JP 2003-171143 A, Jun. 17, 2003.*
Machine Translation of JP 2010-094896 A, Apr. 30, 2010.*
Extended European Search Report dated Mar. 31, 2015 issued in the counterpart European Patent Application No. 12855120.7.

* cited by examiner

*Primary Examiner* — Anthony J Green
*Assistant Examiner* — Elizabeth A Bolden
(74) *Attorney, Agent, or Firm* — Carrier Blackman & Associates, P.C.; Joseph P. Carrier; William D. Blackman (57) ABSTRACT

Glass fibers having non-circular cross sections, excellent strength and excellent modulus of elasticity, and a fiber-reinforced resin compact using the same are provided. The glass fibers having non-circular cross sections are obtained by spinning the molten glass prepared by melting a glass composition as a raw material for the glass fibers. The glass fibers have a composition in which the content of $SiO_2$ is 57.0 to 63.0% by mass, the content of $Al_2O_3$ is 19.0 to 23.0% by mass, the content of MgO is 10.0 to 15.0% by mass and the content of CaO is 5.5 to 11.0% by mass, in relation to the total amount of the glass fibers, and the ratio of the content of MgO to the content of CaO, MgO/CaO falls within a range from 0.8 to 2.0.

8 Claims, 1 Drawing Sheet

GLASS FIBERS HAVING NON-CIRCULAR CROSS SECTIONS, AND FIBER-REINFORCED RESIN COMPACT USING SAME

TECHNICAL FIELD

The present invention relates to glass fibers having non-circular cross sections, and a fiber-reinforced resin compact using the same.

BACKGROUND ART

Glass fibers having non-circular cross sections have hitherto been proposed (for example, see Patent Literature 1). In the present application, a shape in which all the positions on the circumference are separated by an equal distance from the center of the shape is defined as a perfect circle, and shapes different from the perfect circle are defined as non-circular shapes. Examples of the non-circular shapes include a flat shape, a star shape, a cruciform, a polygon and a doughnut shape, and the like. Examples of the flat shape include an elliptical shape, an oval shape and a cocoon shape.

The glass fibers having non-circular cross sections are mixed and melted with a thermoplastic resin, and the resulting molten mixture is injection molded to form a fiber-reinforced resin compact; in this way the glass fibers having non-circular cross sections are regarded to be capable of improving, for example, the mechanical strength, dimensional accuracy and warping of the fiber-reinforced resin compact. The reasons for improving the mechanical strength of the fiber-reinforced resin compact include the fact that the glass fibers having non-circular cross sections have a larger contact area with the thermoplastic resin, as compared to glass fibers having perfectly circular cross sections. The reasons for improving the dimensional accuracy, warping and the like of the fiber-reinforced resin compact include the fact that the glass fibers having non-circular cross sections are more satisfactory in the orientation in the directions along the plane of the compact and tend to be more two-dimensionally oriented at the time of forming the fiber-reinforced resin compact, as compared to glass fibers having perfectly circular cross sections.

The glass fibers having non-circular cross sections are generally formed of E-glass, and the glass fibers composed of E-glass may not be able to attain sufficient strength and sufficient modulus of elasticity. Accordingly, it is desirable to impart sufficient strength and sufficient modulus of elasticity to the glass fibers having non-circular cross sections.

Glass fibers composed of S-glass are known as glass fibers more excellent in strength than the glass fibers composed of E-glass. The glass fibers composed of S glass has a composition in which the content of $SiO_2$ is about 65% by mass, the content of $Al_2O_3$ is about 25% by mass and the content of MgO is about 10% by mass, in relation to the total amount of the glass fibers. However, when a glass composition as the raw material for S-glass is melted into molten glass, and glass fibers are obtained by spinning the molten glass, S-glass has a problem that the difference between the 1000-poise temperature of the molten glass and the liquid phase temperature of the molten glass is small.

The "1000-poise temperature" means the temperature at which the viscosity of the molten glass comes to be 1000 poises, and the "liquid phase temperature" means the temperature at which crystals start to precipitate when the temperature of the molten glass is decreased. In general, the appropriate viscosity in the production of glass fibers is said to be 1000 poises or less, and in the foregoing spinning, the wider the temperature range (working temperature range) between the 1000-poise temperature and the liquid phase temperature, the more stably the spinning can be performed; and hence, the working temperature range is used as an indication for ensuring spinnability.

When the difference between the 1000-poise temperature of the molten glass and the liquid phase temperature of the molten glass is small, in the process during which the molten glass is spun and then cooled to be glass fibers, the glass fibers tend to undergo crystallization (devitrification) even under the effect of slight temperature decrease and a problem of breakage of glass fibers or the like tends to occur. S-glass has a narrow working temperature range, and hence, when the glass composition as the raw material for S-glass is melted to prepare a molten glass, it is difficult to stably spin glass fibers having non-circular cross sections from the resulting molten glass. The "devitrification" is the phenomenon that crystals precipitate when the temperature of the molten glass is decreased.

Accordingly, a glass composition has been proposed in which the composition of the glass composition as the raw material for S-glass is improved in such a way that the glass composition includes CaO as well as $SiO_2$, $Al_2O_3$ and MgO. As the foregoing glass composition, a glass composition is known which allows the spinning to be easily performed at relatively low temperatures while the working temperature range is being maintained, for example, by decreasing the viscosity on the basis of the decrease of the 1000-poise temperature (see, Patent Literature 2). As the foregoing glass composition, a glass composition is also known in which the difference between the 1000-poise temperature and the liquid phase temperature is large (see, Patent Literature 3).

CITATION LIST

Patent Literature

Patent Literature 1: Japanese Unexamined Patent Application Publication No. 2006-45390
Patent Literature 2: Japanese Examined Patent Application Publication No. 62-001337
Patent Literature 3: Japanese Unexamined Patent Application Publication No. 2009-514773

SUMMARY OF INVENTION

Problems to be Solved by the Invention

However, the glass composition described in Patent Literature 2 including CaO as well as $SiO_2$, $Al_2O_3$ and MgO tends to undergo devitrification when melted into a molten glass, and it is difficult to stably spin the resulting molten glass. When the glass composition of Patent Literature 3 is melted into a molten glass, the 1000-poise temperature of the resulting molten glass is high, and hence the mass production of glass fibers from the resulting molten glass is difficult. Accordingly, there is an inconvenience that it is difficult to obtain glass fibers having non-circular cross sections, excellent strength and excellent modulus of elasticity from these conventional glass compositions.

An object of the present invention is to provide glass fibers having non-circular cross sections, excellent strength and excellent modulus of elasticity by solving such an inconvenience.

Another object of the present invention is to provide a fiber-reinforced resin compact using the glass fibers having non-circular cross sections.

Solution to Problem

In order to achieve such objects as described above, the present invention provides glass fibers having non-circular cross sections, spun from a molten glass prepared by melting a glass composition as a raw material for the glass fibers, wherein the glass fibers have a composition wherein the content of $SiO_2$ is 57.0 to 63.0% by mass, the content of $Al_2O_3$ is 19.0 to 23.0% by mass, the content of MgO is 10.0 to 15.0% by mass and the content of CaO is 5.5 to 11.0% by mass, in relation to the total amount of the glass fibers, and the ratio of the content of MgO to the content of CaO, MgO/CaO falls within a range from 0.8 to 2.0.

According to the present invention, a glass composition as a raw material for the glass fibers having the foregoing composition is melted into a molten glass. Then, by spinning the molten glass, the glass fibers having non-circular cross sections are obtained. The glass fibers having non-circular cross sections of the present invention have the foregoing composition, and consequently can obtain excellent strength and excellent modulus of elasticity.

In the glass fibers, when the content of $SiO_2$ is less than 57.0% by mass in relation to the total amount of the glass fibers, sufficient mechanical strength cannot be obtained as the glass fibers, and when the content of $SiO_2$ exceeds 63.0% by mass in relation to the total amount of the glass fibers, the 1000-poise temperature and the liquid phase temperature of the molten glass obtained from the glass composition as the raw material for the glass fibers becomes high.

In the glass fibers, when the content of $Al_2O_3$ is less than 19.0% by mass in relation to the total amount of the glass fibers, sufficient modulus of elasticity cannot be obtained, and when the content of $Al_2O_3$ exceeds 23.0% by mass in relation to the total amount of the glass fibers, the liquid phase temperature of the molten glass obtained from the glass composition as the raw material for the glass fibers becomes high.

In the glass fibers, when the content of MgO is less than 10.0% by mass in relation to the total amount of the glass fibers, sufficient modulus of elasticity cannot be obtained, and when the content of MgO exceeds 15.0% by mass in relation to the total amount of the glass fibers, the liquid phase temperature of the molten glass obtained from the glass composition as the raw material for the glass fibers becomes high.

In the glass fibers, when the content of CaO is less than 5.5% by mass in relation to the total amount of the glass fibers, the liquid phase temperature of the glass composition is high, and when the content of CaO exceeds 11.0% by mass in relation to the total amount of the glass fibers, the 1000-poise temperature and the liquid phase temperature of the molten glass obtained from the glass composition as the raw material for the glass fibers become high.

In the glass fibers, when the ratio of the content of MgO to the content of CaO, MgO/CaO is less than 0.8, sufficient modulus of elasticity cannot be obtained, and when the ratio MgO/CaO exceeds 2.0, the liquid phase temperature of the molten glass obtained from the glass composition as the raw material for the glass fibers becomes high.

In the glass fibers having non-circular cross sections of the present invention, the cross section, for example, has a flat shape. The flat shape can be, for example, a shape selected from the group consisting of an elliptical shape, an oval shape and a cocoon shape.

When the glass fibers tend to undergo devitrification at the time of spinning the molten glass obtained from the glass composition as the raw material for the glass fibers, a problem of breakage of glass fibers or the like occurs. However, in the present invention, the glass fibers have the foregoing composition, and hence the crystal precipitating first, when the molten glass is decreased in temperature (the initial phase of devitrification), is a single crystal of cordierite or a mixed crystal composed of cordierite and anorthite. Depending on the type of the initial phase of devitrification, the devitrification is known to affect the precipitation of crystal, the generation of bubbles or the like; however, the molten glass finds difficulty in crystal precipitation at the liquid phase temperature as compared to the case where the initial phase of devitrification is crystals other than the foregoing crystals. Accordingly, at the time of spinning the molten glass obtained by melting the glass composition as the raw material for the glass fibers, the occurrence of a trouble such as the breakage of the glass fibers can be suppressed, and stable spinning can be performed.

In the present invention, the molten glass has a working temperature range of 50° C. or more, wherein the working temperature range is the temperature range between the 1000-poise temperature at which the viscosity of the molten glass comes to be 1000 poises and the liquid phase temperature at which crystals start to precipitate when the temperature of the molten glass is decreased, and has a viscosity corresponding to the liquid phase temperature (liquid phase viscosity) of 3000 poises or more; and hence, the cross sections of the glass fibers can be made non-circular.

The production of the glass fibers having non-circular cross sections is more severe in the setting conditions of the temperature range of the spinning temperature than the production of glass fibers having circular cross sections. In order to make the cross sections non-circular, the spinning is required to be performed at a high viscosity of 1000 poises or more. When the viscosity of the molten glass at the time of spinning is less than 1000 poises, the spun glass fibers may have circular cross sections due to the surface tension to disable the cross sections of the glass fibers to be made non-circular. Accordingly, in order to make the cross sections non-circular, generally spinning is required to be performed at a high viscosity of 1000 poises or more. In order to satisfy this condition and to ensure the working temperature range for performing spinning, the liquid phase viscosity is required to be at least 3000 poises or more. In order to stably performing spinning, the liquid phase viscosity is preferably 4000 poises or more and more preferably 5000 poises or more.

The working temperature range, which is the difference between the 1000-poise temperature and the liquid phase temperature, is also required to be 50° C. or more. When the working temperature range is narrow, a trouble may occur at the time of spinning in which, for example, the molten glass undergoes devitrification to result in breakage of the glass fibers.

Accordingly, the present invention is the glass fibers having non-circular cross sections, spun from the molten glass prepared by melting a glass composition as a raw material for the glass fibers, wherein in the molten glass, the working temperature range, which is a difference between the 1000-poise temperature and the liquid phase temperature is 50° C. or more, and the liquid phase viscosity which is the viscosity corresponding to the liquid phase temperature is 3000 poises or more.

The molten glass prepared by melting the glass composition as the raw material for the glass fibers of the present invention has the temperature conditions for spinning the foregoing glass fibers having non-circular cross sections. Accordingly, glass fibers having non-circular cross sections can be stably spun.

In the present invention, the glass fibers preferably have a strength of 4.0 GPa or more and a modulus of elasticity of 85 GPa or more. The glass fibers having non-circular cross sections of the present invention, by having a strength of 4.0 GPa or more and a modulus of elasticity of 85 GPa or more, can be suitably used in the application to constitute a fiber-reinforced resin compact.

The fiber-reinforced resin compact of the present invention is formed by mixing and melting the glass fibers having non-circular cross sections and a thermoplastic resin and by injection molding the resulting molten mixture. The fiber-reinforced resin compact of the present invention includes the glass fibers having non-circular cross sections, and hence is improved in mechanical strength, dimensional accuracy, warping or the like and can obtain excellent strength.

DESCRIPTION OF EMBODIMENT

Next, the embodiment of the present invention is described in more detail.

The glass fibers having non-circular cross sections of the present embodiment is obtained by spinning the molten glass prepared by melting a glass composition as a raw material for the glass fibers. The glass fibers having non-circular cross sections of the present embodiment may have cross sections such as flat shape cross sections, star shaped cross sections, cruciform cross sections, polygonal cross sections, trefoil cross sections, quatrefoil cross sections, H-shaped cross sections, U-shaped cross sections, V-shaped cross sections, and doughnut shaped cross sections. The flat shape can be, for example, any of an elliptical shape, an oval shape and a cocoon shape.

The glass fibers having non-circular cross sections of the present embodiment have a composition wherein the content of $SiO_2$ is 57.0 to 63.0% by mass, the content of $Al_2O_3$ is 19.0 to 23.0% by mass, the content of MgO is 10.0 to 15.0% by mass and the content of CaO is 5.5 to 11.0% by mass, in relation to the total amount of the glass fibers, and the ratio of the content of MgO to the content of CaO, MgO/CaO falls within a range from 0.8 to 2.0.

In the glass fibers, when the content of $SiO_2$ is less than 57.0% by mass in relation to the total amount of the glass fibers, sufficient mechanical strength cannot be obtained as the glass fibers, and when the content of $SiO_2$ exceeds 63.0% by mass in relation to the total amount of the glass fibers, the 1000-poise temperature and the liquid phase temperature of the molten glass obtained from the glass composition as the raw material for the glass fibers are high. In order to set the 1000-poise temperature of the molten glass composition obtained from the glass composition as the raw material for the glass fibers at 1350° C. or lower, the content of $SiO_2$ preferably falls within a range from 57.0 to 62.0% by mass and more preferably falls within a range from 57.0 to 61.0% by mass in relation to the total amount of the glass fibers.

In the glass fibers, when the content of $Al_2O_3$ is less than 19.0% by mass in relation to the total amount of the glass fibers, sufficient modulus of elasticity cannot be obtained, and when the content of $Al_2O_3$ exceeds 23.0% by mass, the liquid phase temperature of the molten glass obtained from the glass composition as the raw material for the glass fibers is high. In order to obtain excellent modulus of elasticity in the glass fibers and at the same time widen the working temperature range of the molten glass by decreasing the liquid phase temperature of the molten glass, the content of $Al_2O_3$ preferably falls within a range from 19.5 to 22.0% by mass and more preferably falls within a range from 20.0 to 21.0% by mass in relation to the total amount of the glass fibers.

In the glass fibers, because the content of $Al_2O_3$ falls within the range from 19.0 to 23.0% by mass, in particular, is in the vicinity of 20.0% by mass in relation to the total amount of the glass fibers, the initial phase of devitrification in the molten glass obtained from the glass composition as the raw material for the glass fibers can be made to be a single crystal of cordierite or a mixed crystal composed of cordierite and anorthite. When the content of $Al_2O_3$ is less than 19.0% by mass in relation to the total amount of the glass fibers, the initial phase of devitrification in the molten glass obtained from the glass composition as the raw material for the glass fibers may not be made to be a single crystal of cordierite or a mixed crystal composed of cordierite and anorthite. Accordingly, in the glass fibers, for the purpose of allowing the initial phase of devitrification in the molten glass obtained from the glass composition as the raw material for the glass fibers to be a single crystal of cordierite or a mixed crystal composed of cordierite and anorthite, the content of $Al_2O_3$ preferably falls within a range in the vicinity of 19.0% by mass to 22.0% by mass in relation to the total amount of the glass fibers.

The content of $SiO_2$/the content of $Al_2O_3$ is preferably 2.6 to 3.3 in terms of weight ratio. This is because such a range as described above widens the working temperature range at the time of production of the glass fibers, and allows the glass fibers to have sufficient modulus of elasticity. The content of $SiO_2$/the content of $Al_2O_3$ is more preferably 2.7 to 3.2 in terms of weight ratio. This is because the weight ratio of the content of $SiO_2$/the content of $Al_2O_3$ of 3.2 or less yields the glass fibers having high modulus of elasticity. Moreover, if the weight ratio of 2.7 or more the liquid phase temperature is decreased and at the same time allows the devitrification phenomenon to be suppressed.

In the glass fibers, when the content of MgO is less than 10.0% by mass in relation to the total amount of the glass fibers, sufficient modulus of elasticity cannot be obtained, and when the content of MgO exceeds 15.0% by mass in relation to the total amount of the glass fibers, the liquid phase temperature of the molten glass obtained from the glass composition as the raw material for the glass fibers becomes high. In order to obtain excellent modulus of elasticity in the glass fibers and at the same time widen the working temperature range of the molten glass by decreasing the liquid phase temperature of the molten glass, the content of MgO preferably falls within a range from 11.0 to 14.0% by mass and more preferably falls within a range from 11.5 to 13.0% by mass in relation to the total amount of the glass fibers.

In the glass fibers, when the content of CaO is less than 5.5% by mass in relation to the total amount of the glass fibers, the liquid phase temperature of the molten glass obtained from the glass composition as the raw material for the glass fibers becomes high, and when the content of CaO exceeds 11.0% by mass in relation to the total amount of the glass fibers, the 1000-poise temperature and the liquid phase temperature of the molten glass are high. In order to widen the working temperature range of the molten glass by decreasing the 1000-poise temperature and the liquid phase temperature of the molten glass, the content of CaO preferably falls within a range from 6.0 to 10.5% by mass and more preferably falls within a range from 7.0 to 10.0% by mass in relation to the total amount of the glass fibers.

In the glass fibers, when the ratio of the content of MgO to the content of CaO, MgO/CaO is less than 0.8, sufficient modulus of elasticity cannot be obtained, and when the ratio MgO/CaO exceeds 2.0, the liquid phase temperature of the molten glass obtained from the glass composition as the raw material for the glass fibers becomes high. In order to obtain excellent modulus of elasticity in the glass fibers and at the same time widen the working temperature range of the molten glass by decreasing the liquid phase temperature of the molten glass, the ratio of the content of MgO to the content of Cao, MgO/CaO preferably falls within a range from 1.0 to 1.8.

The glass fibers include, as the basic composition, $SiO_2$, $Al_2O_3$, MgO and CaO in the contents falling within the foregoing ranges; however, the glass fibers may also include other components inevitably mixed in the glass fibers, for example, because of being included in the raw materials for the respective components. Examples of the other components include: alkali metal oxides such as $Na_2O$, or $Fe_2O_3$, $TiO_2$, $ZrO_2$, $MoO_3$ and $Cr_2O_3$. The content of the other components is preferably less than 1.0% by mass, more preferably less than 0.5% by mass and furthermore preferably less than 0.2% by mass in relation to the total amount of the glass fibers.

The glass fibers can obtain sufficient modulus of elasticity on the basis of the total content of $SiO_2$, $Al_2O_3$, MgO and CaO of 99.0% by mass or more and a relatively small content of the other impurity components. On the basis of the foregoing contents, it is also possible to ensure the sufficient working temperature range when the glass fibers are produced from the molten glass obtained from the glass composition as the raw material for the glass fibers.

When the total content of $SiO_2$, $Al_2O_3$, MgO and CaO is 99.5% by mass or more, it is possible to obtain more excellent modulus of elasticity in the glass fibers. In order to ensure sufficient working temperature range in the molten glass obtained from the glass composition as the raw material for the glass fibers, the total content of $SiO_2$, $Al_2O_3$, MgO and CaO more preferably falls within a range of 99.8% by mass or more in relation to the total amount of the glass fibers.

The glass fibers have the same composition as that of the glass composition as the raw material and that of the molten glass obtained by melting the glass composition.

As the glass composition as the raw material for the glass fibers, glass cullets or glass batch can be used. The molten glass can be obtained by a method of re-melting the glass cullets or by a method of directly melting the glass batch. In the molten glass, specifically the working temperature range, the difference between the 1000-poise temperature and the liquid phase temperature is 50° C. or more. In the molten glass, the viscosity corresponding to the liquid phase temperature (liquid phase viscosity) is 3000 poises or more, and, from the viewpoint of the spinning stability, is preferably 4000 poises or more and more preferably 5000 poises or more.

The glass fibers having non-circular cross sections themselves can be produced from the molten glass by a heretofore known method. According to the heretofore known method, the molten glass was drawn and spun from tens to thousands of platinum alloy nozzles called a bushing, and the resulting fibers are taken up to yield glass fibers.

Here, the molten glass can be made to have a high viscosity by being decreased in temperature; however, if the intended high viscosity region is lower than the liquid phase temperature, the molten glass undergoes devitrification, and a trouble such as breakage of glass fibers may occur. However, the molten glass of the present embodiment has the same composition as that of the glass fibers, has a wide working temperature range, gives the initial phase of devitrification composed of a single crystal of cordierite or a mixed crystal composed of cordierite and anorthite, and has a small crystallization rate. Accordingly, the molten glass can be stably spun without undergoing devitrification, and thus the glass fibers having non-circular cross sections can be obtained.

In order to spin glass fibers having non-circular cross sections from the molten glass by preventing the molten glass from tending to become circular in cross section due to the surface tension of the molten glass, the spinning is required to be performed at a high viscosity of 1000 poises or more. Such a spinning in a high viscosity region of 1000 poises or more requires the molten glass to be decreased in temperature, and hence the glass may undergo devitrification. Accordingly, in the case where the liquid phase viscosity is at least 3000 poises or more, when the molten glass is drawn from the nozzles, glass fibers having non-circular cross sections can be spun without causing the devitrification of the glass.

As described above, the spinning of glass fibers having non-circular cross sections requires the selection of the composition of glass and the selection of the spinning temperature range to be performed more strictly than the spinning of glass fibers having circular cross sections.

The glass fibers having non-circular cross sections, spun as described above has a strength of 4.0 GPa or more and a modulus of elasticity of 85 GPa or more.

The glass fibers having non-circular cross sections of the present embodiment has such an excellent strength and such an excellent modulus of elasticity as described above. Accordingly, for example, by mixing and melting the glass fibers having non-circular cross sections of the present embodiment with a thermoplastic resin, and by injection molding the resulting molten mixture, a fiber-reinforced resin compact being improved in, for example, mechanical strength, dimensional accuracy and warping and having excellent strength and excellent modulus of elasticity can be obtained.

In the glass fibers having non-circular cross sections, the fiber diameter thereof preferably falls within a range from 3 to 30 μm in terms of the perfect circles having the same cross-sectional areas as the actual cross-sectional areas of the fibers, for the purpose of using the glass fibers having non-circular cross sections as a base material of the fiber-reinforced resin compact. In the glass fibers having non-circular cross sections, when the major axis and the minor axis in the cross section are measured, the glass deformation ratio represented by the ratio of major axis/minor axis preferably falls within a range from 2 to 10, for the purpose of using the glass fibers having non-circular cross sections as a base material of the fiber-reinforced resin compact.

Examples of the thermoplastic resin include: polyethylene resin, polypropylene resin, polystyrene resin, acrylonitrile/butadiene/styrene (ABS)resin, methacrylic resin, vinyl chloride resin, polyamide resin, polyacetal resin, polyethylene terephthalate (PET) resin, polybutylene terephthalate (PBT) resin, polycarbonate resin, polyphenylene sulfide (PPS) resin, polyether ether ketone (PEEK) resin, liquid crystal polymer (LCP) resin, fluororesin, polyether imide (PEI) resin, polyarylate (PAR) resin, polysulfone (PSF)resin, polyethersulfone (PES) resin and polyamide-imide (PAI) resin, or the like.

In place of the thermoplastic resin, a thermosetting resin may also be used; examples of the thermosetting resin may include unsaturated polyester resin, vinyl ester resin, epoxy resin, melamine resin and phenol resin. The thermoplastic resin and the thermosetting resin may be used each alone or in combinations of two or more thereof.

In place of injection molding, for example, the following heretofore known molding methods can also be used: a stamping molding method, an infusion method, a hand lay-up method, a spray-up method, a resin transfer molding (RTM) method, a sheet molding compound (SMC) method, a bulk molding compound (BMC) method, a protrusion method and a filament winding method, or the like.

In the molding method, the glass fibers having non-circular cross sections of the present embodiment may be used alone, or for example, in combination with one or more of the following types of fibers: glass fibers having perfectly circular cross sections having the same composition as the composition of the glass fibers having non-circular cross sections of the present embodiment, heretofore known commercially available glass fibers, carbon fibers, organic fibers and ceramic fibers or the like.

The glass fibers having non-circular cross sections of the present embodiment can also be used as materials for producing glass fiber-reinforced base materials for use in various composite materials such as glass fiber woven fabric, braided fabric, knitted fabric, non-woven fabric, matting, triaxial braided fabric, quadraxial braided fabric, chopped strand, roving and powder or the like.

The fiber-reinforced resin compact of the present embodiment can be suitably used for use in, for example, components and members required to have excellent mechanical strength or excellent dimensional accuracy. Examples of such components and members may include vehicle exterior members, vehicle interior members, vehicle engine peripheral members, electronic device housings, electronic components and high pressure tanks.

Examples of the vehicle exterior members may include door mirrors, sunroof peripheral components; examples of the vehicle interior members may include console boxes; and examples of the vehicle engine peripheral members may include engine covers. Examples of the electronic device housings may include cell phones enclosures, personal computer enclosures, digital camera lens barrels and game machine enclosures. Examples of the electronic components may include various connectors.

Next, Examples and Comparative Example of the present invention are presented.

EXAMPLES

Example 1

In present Example, first a glass composition was obtained by mixing glass raw materials in such a way that the content of $SiO_2$ was 60.2% by mass, the content of $Al_2O_3$ was 20.1% by mass, the content of MgO was 10.1% by mass, the content of CaO was 9.5% by mass and the content of $Fe_2O_3$ was 0.1% by mass, in relation to the total amount of the glass composition. In the glass composition, the sum content of $SiO_2$, $Al_2O_3$, MgO and CaO is 99.9% by mass, and the ratio of the content of MgO to the content of CaO, MgO/CaO is 1.1. The composition of the glass composition is shown in Table 1.

Next, crushed glass having the same composition as the composition of the glass composition was placed in a platinum boat and heated in a tubular electric furnace provided with a temperature gradient, covering a range of from 1000 to 1500° C., and the temperature at which crystals started to precipitate was taken as the liquid phase temperature.

Next, the glass composition was melted in the platinum boat, and while the temperature of the molten glass was being varied, the viscosity of the molten glass was continuously measured by using a rotary B-type viscometer, and the temperature corresponding to the viscosity of 1000 poises was taken as the 1000-poise temperature. The viscosity corresponding to the liquid phase temperature was taken as the liquid phase viscosity. It is to be noted that the viscosity measurement was performed according to JIS Z8803-1991. The 1000-poise temperature, the liquid phase temperature and the liquid phase viscosity are shown in Table 2.

Next, the glass composition was heated for melting to a temperature equal to or higher than the 1000-poise temperature, and then the glass composition was allowed to stand for 6 hours at temperatures lower by 100 to 300° C. than the liquid phase temperature. Thus, the appearance of the crystals developed on the surface and in the interior of the glass composition was observed, and the devitrification resistance was evaluated on the basis of the three grades A, B and C. A indicates that no crystals precipitate, B indicates that crystals precipitate on a portion of the surface and C indicates that crystals precipitate on the surface and in the interior.

Next, the initial phase portion of the crystals precipitated in the sample used for the measurement of the liquid phase temperature was pulverized, the resulting powder was analyzed with an X-ray diffractometer, and thus the identification of the crystal species of the initial phase of devitrification was performed. The evaluation of the devitrification resistance and the crystal species of the initial phase of devitrification are shown in Table 2.

Next, the glass composition was melted into a molten glass, and the resulting molten glass was spun to yield glass fibers having flat-oval cross sections. The obtained glass fibers had the same composition as the composition of the glass composition, and the fiber diameter thereof was found to be 15 μm in terms of the perfect circles having the same cross-sectional areas as the actual cross-sectional areas of the fibers.

Next, by using the monofilament of the glass fibers as a sample, a tensile test was performed and the strength and the modulus of elasticity of the glass fibers were derived.

Next, by using the monofilament of the glass fibers as a sample, the major axis and the minor axis in the cross section of the monofilament were measured, and the ratio of major axis/minor axis was taken as the glass deformation ratio. The cross-sectional shape, the glass deformation ratio, the strength and the modulus of elasticity of the glass fibers are shown in Table 2.

Next, the glass fiber bundles (strands) obtained by bundling the glass fibers having oval cross sections were cut to a length of 3 mm to prepare chopped strands. Next, the obtained chopped strands were melt-kneaded with a polyamide resin (polyamide 66), and fiber-reinforced resin pellets having a glass content of 30% by mass were prepared from the resulting mixture by an extrusion molding method. Next, by using the obtained fiber-reinforced resin pellets, a plate-like fiber-reinforced resin compact having a size of 80 mm×10 mm×4 mm was prepared by an injection molding method, and the strength of the fiber-reinforced resin compact was derived by a tensile test. The results thus obtained are shown in Table 2.

Example 2

In present Example, first a glass composition was obtained by mixing glass raw materials in such a way that the content of $SiO_2$ was 59.2% by mass, the content of $Al_2O_3$ was 20.1% by mass, the content of MgO was 12.6% by mass, the content of CaO was 8.0% by mass and the content of $Fe_2O_3$ was 0.1% by mass, in relation to the total amount of the glass composition. In the glass composition, the sum content of $SiO_2$, $Al_2O_3$, MgO and CaO is 99.9% by mass, and the ratio of the content of MgO to the content of CaO, MgO/CaO is 1.6. The composition of the glass composition obtained in present Example is shown in Table 1.

Next, the liquid phase temperature and the liquid phase viscosity were determined, the devitrification resistance was evaluated and the identification of the crystal species of the initial phase of devitrification was performed in exactly the same manner as in Example 1 except that the glass composition obtained in present Example was used. The results thus obtained are shown in Table 2.

Next, the glass composition was melted into a molten glass, and the resulting molten glass was spun to yield glass fibers having oval cross sections. The obtained glass fibers had the same composition as the composition of the glass composition, and the fiber diameter thereof was found to be 15 μm in terms of the perfect circles having the same cross-sectional areas as the actual cross-sectional areas of the fibers. Next, the strength, the modulus of elasticity and the glass deformation ratio were derived in exactly the same manner as in Example 1 except that the glass fibers having oval cross sections obtained in present Example were used. The results thus obtained are shown in Table 2.

Next, a fiber-reinforced resin compact was prepared and the strength of the fiber-reinforced resin compact was derived by a tensile test in exactly the same manner as in Example 1 except that the glass fibers having oval cross sections obtained in present Example were used. The result thus obtained is shown in Table 2.

Example 3

In present Example, first a glass composition was obtained by mixing glass raw materials in such a way that the content of $SiO_2$ was 58.2% by mass, the content of $Al_2O_3$ was 20.7% by mass, the content of MgO was 12.0% by mass, the content of CaO was 9.0% by mass and the content of $Fe_2O_3$ was 0.1% by mass, in relation to the total amount of the glass composition. In the glass composition, the sum content of $SiO_2$, $Al_2O_3$, MgO and CaO is 99.9% by mass, and the ratio of the content of MgO to the content of CaO, MgO/CaO is 1.3. The composition of the glass composition obtained in present Example is shown in Table 1.

Next, the liquid phase temperature and the liquid phase viscosity were determined, the devitrification resistance was evaluated and the identification of the crystal species of the initial phase of devitrification was performed in exactly the same manner as in Example 1 except that the glass composition obtained in present Example was used. The results thus obtained are shown in Table 2.

Next, the glass composition was melted into a molten glass, and the resulting molten glass was spun to yield glass fibers having oval cross sections. The obtained glass fibers had the same composition as the composition of the glass composition, and the fiber diameter thereof was found to be 15 μm in terms of the perfect circles having the same cross-sectional areas as the actual cross-sectional areas of the fibers. Next, the strength, the modulus of elasticity and the glass deformation ratio were derived in exactly the same manner as in Example 1 except that the glass fibers having oval cross sections obtained in present Example were used. The results thus obtained are shown in Table 2.

Next, a fiber-reinforced resin compact was prepared and the strength of the fiber-reinforced resin compact was derived by a tensile test in exactly the same manner as in Example 1 except that the glass fibers having oval cross sections obtained in present Example were used. The result thus obtained is shown in Table 2.

Example 4

In present Example, first a glass composition was obtained by mixing glass raw materials in such a way that the content of $SiO_2$ was 61.4% by mass, the content of $Al_2O_3$ was 19.0% by mass, the content of MgO was 12.9% by mass, the content of CaO was 6.5% by mass, the content of $Fe_2O_3$ was 0.1% by mass and the content of $Na_2O$ was 0.1% by mass, in relation to the total amount of the glass composition. In the glass composition, the sum content of $SiO_2$, $Al_2O_3$, MgO and CaO is 99.8% by mass, and the ratio of the content of MgO to the content of CaO, MgO/CaO is 2.0. The composition of the glass composition obtained in present Example is shown in Table 1.

Next, the liquid phase temperature and the liquid phase viscosity were determined, the devitrification resistance was evaluated and the identification of the crystal species of the initial phase of devitrification was performed in exactly the same manner as in Example 1 except that the glass composition obtained in present Example was used. The results thus obtained are shown in Table 2.

Next, the glass composition was melted into a molten glass, and the resulting molten glass was spun to yield glass fibers having oval cross sections. The obtained glass fibers had the same composition as the composition of the glass composition, and the fiber diameter thereof was found to be 15 μm in terms of the perfect circles having the same cross-sectional areas as the actual cross-sectional areas of the fibers. Next, the strength, the modulus of elasticity and the glass deformation ratio were derived in exactly the same manner as in Example 1 except that the glass fibers having oval cross sections obtained in present Example were used. The results thus obtained are shown in Table 2.

Example 5

In present Example, first a glass composition was obtained by mixing glass raw materials in such a way that the content of $SiO_2$ was 58.0% by mass, the content of $Al_2O_3$ was 21.9% by mass, the content of MgO was 10.0% by mass, the content of CaO was 10.0% by mass and the content of $Fe_2O_3$ was 0.1% by mass, in relation to the total amount of the glass composition. In the glass composition, the sum content of $SiO_2$, $Al_2O_3$, MgO and CaO is 99.9% by mass, and the ratio of the content of MgO to the content of CaO, MgO/CaO is 1.0. The composition of the glass composition obtained in present Example is shown in Table 1.

Next, the liquid phase temperature and the liquid phase viscosity were determined, the devitrification resistance was evaluated and the identification of the crystal species of the initial phase of devitrification was performed in exactly the same manner as in Example 1 except that the glass composition obtained in present Example was used. The results thus obtained are shown in Table 2.

Next, the glass composition was melted into a molten glass, and the resulting molten glass was spun to yield glass fibers having oval cross sections. The obtained glass fibers had the same composition as the composition of the glass composition, and the fiber diameter thereof was found to be 15 μm in terms of the perfect circles having the same cross-sectional areas as the actual cross-sectional areas of the fibers. Next, the strength, the modulus of elasticity and the glass deformation ratio were derived in exactly the same manner as in Example 1 except that the glass fibers having oval cross sections obtained in present Example were used. The results thus obtained are shown in Table 2.

Example 6

In present Example, first a glass composition was obtained by mixing glass raw materials in such a way that the content of $SiO_2$ was 57.0% by mass, the content of $Al_2O_3$ was 20.0% by mass, the content of MgO was 12.0% by mass, the content of CaO was 10.9% by mass and the content of $Fe_2O_3$ was 0.1% by mass, in relation to the total amount of the glass composition. In the glass composition, the sum content of $SiO_2$, $Al_2O_3$, MgO and CaO is 99.9% by mass, and the ratio of the content of MgO to the content of CaO, MgO/CaO is 1.1. The composition of the glass composition obtained in present Example is shown in Table 1.

Next, the liquid phase temperature and the liquid phase viscosity were determined, the devitrification resistance was evaluated and the identification of the crystal species of the initial phase of devitrification was performed in exactly the same manner as in Example 1 except that the glass composition obtained in present Example was used. The results thus obtained are shown in Table 2.

Next, the glass composition was melted into a molten glass, and the resulting molten glass was spun to yield glass fibers having oval cross sections. The obtained glass fibers had the same composition as the composition of the glass composition, and the fiber diameter thereof was found to be 15 μm) in terms of the perfect circles having the same cross-sectional areas as the actual cross-sectional areas of the fibers. Next, the strength, the modulus of elasticity and the glass deformation ratio were derived in exactly the same manner as in Example 1 except that the glass fibers having oval cross sections obtained in present Example were used. The results thus obtained are shown in Table 2.

Next, a fiber-reinforced resin compact was prepared and the strength of the fiber-reinforced resin compact was derived by a tensile test in exactly the same manner as in Example 1 except that the glass fibers having oval cross sections obtained in present Example were used. The result thus obtained is shown in Table 2.

Comparative Example 1

In present Comparative Example, the liquid phase temperature and the liquid phase viscosity were determined, the devitrification resistance was evaluated and the identification of the crystal species of the initial phase of devitrification was performed in exactly the same manner as in Example 1 except that so-called S-glass ($SiO_2$: 64 to 66%, $Al_2O_3$: 24 to 26%, MgO: 9 to 11%) was used. The results thus obtained are shown in Table 2.

Next, the glass composition was melted into a molten glass, and the resulting molten glass was spun; however, devitrification occurred in the molten glass, and spun fiber breakage occurred frequently; accordingly, glass fibers having oval cross sections were not able to be obtained. The spinning was performed at an elevated temperature of the molten glass lest the molten glass should undergo devitrification, but glass fibers drawn from the platinum nozzles were not able to be prevented from becoming circular in cross-section, and consequently the glass fibers were found to have nearly perfectly circular cross sections. The obtained glass fibers had the same composition as the composition of the glass composition, and the fiber diameter thereof was found to be 15 μm.

The glass fibers obtained in present Comparative Example had nearly perfectly circular cross sections as described above, and hence the glass deformation ratio, the strength and the modulus of elasticity of the glass fibers, and the strength of the fiber-reinforced resin compact were not derived, as indicated with the mark "-" in Table 2.

Comparative Example 2

In present Comparative Example, the liquid phase temperature and the liquid phase viscosity were determined, the devitrification resistance was evaluated and the identification of the crystal species of the initial phase of devitrification was performed in exactly the same manner as in Example 1 except that so-called E-glass (the content of $SiO_2$ was 52.0 to 56.0% by mass, the content of $Al_2O_3$ was 12.0 to 16.0% by mass, the content of MgO was 0 to 6% by mass, the content of CaO was 16 to 25% by mass, the content of $Na_2O$ was 0 to 0.8% by mass and the content of $B_2O_3$ was 5.0 to 10.0% by mass) was used. The results thus obtained are shown in Table 2.

Next, the liquid phase temperature and the liquid phase viscosity were determined, the devitrification resistance was evaluated and the identification of the crystal species of the initial phase of devitrification was performed in exactly the same manner as in Example 1 except that the glass composition obtained in present Comparative Example was used. The results thus obtained are shown in Table 2.

Next, the glass composition was melted into a molten glass, and the resulting molten glass was spun to yield glass fibers having oval cross sections. The obtained glass fibers had the same composition as the composition of the glass composition, and the fiber diameter thereof was found to be 15 μm in terms of the perfect circles having the same cross-sectional areas as the actual cross-sectional areas of the fibers. Next, the strength, the modulus of elasticity and the glass deformation ratio were derived in exactly the same manner as in Example 1 except that the glass fibers having oval cross sections obtained in present Comparative Example were used. The results thus obtained are shown in Table 2.

Next, a fiber-reinforced resin compact was prepared and the strength of the fiber-reinforced resin compact was derived by a tensile test in exactly the same manner as in Example 1 except that the glass fibers having oval cross sections obtained in present Comparative Example were used. The result thus obtained is shown in Table 2.

TABLE 1

| | Examples | | | | | |
|---|---|---|---|---|---|---|
| | 1 | 2 | 3 | 4 | 5 | 6 |
| $SiO_2$ | 60.2 | 59.2 | 58.2 | 61.4 | 58.0 | 57.0 |
| $Al_2O_3$ | 20.1 | 20.1 | 20.7 | 19.0 | 21.9 | 20.0 |
| MgO | 10.1 | 12.6 | 12 | 12.9 | 10.0 | 12.0 |
| CaO | 9.5 | 8.0 | 9.0 | 6.5 | 10.0 | 10.9 |
| $Fe_2O_3$ | 0.1 | 0.1 | 0.1 | 0.1 | 0.1 | 0.1 |
| $Na_2O$ | 0 | 0 | 0 | 0.1 | 0 | 0 |
| $B_2O_3$ | 0 | 0 | 0 | 0 | 0 | 0 |
| MgO/CaO | 1.1 | 1.6 | 1.3 | 2.0 | 1.0 | 1.1 |

TABLE 2

|  |  | Examples | | | | | | Comparative Examples | |
| --- | --- | --- | --- | --- | --- | --- | --- | --- | --- |
|  |  | 1 | 2 | 3 | 4 | 5 | 6 | 1 | 2 |
| 1000-Poise temperature (° C.) | | 1343 | 1319 | 1320 | 1349 | 1335 | 1291 | 1470 | 1200 |
| Liquid phase temperature (° C.) | | 1238 | 1262 | 1230 | 1293 | 1285 | 1239 | 1465 | 1065 |
| Working temperature range (° C.) | | 105 | 57 | 90 | 56 | 50 | 52 | 5 | 135 |
| Liquid phase viscosity (poises) | | 7000 | 4000 | 5000 | 4000 | 3000 | 3500 | 1100 | 15000 |
| Devitrification resistance | | A | A | A | A | A | A | C | A |
| Initial phase of devitrification | | cor/ano | cor | cor | cor | cor/ano | cor | mul | cri |
| Glass fibers | Cross-sectional shape | ○ | ○ | ○ | ○ | ○ | ○ | X | ○ |
|  | Deformation ratio | 4.0 | 4.0 | 4.0 | 4.0 | 4.0 | 4.0 | — | 4.0 |
|  | Strength | 4.1 | 4.0 | 4.1 | 4.1 | 4.0 | 4.0 | — | 3.3 |
|  | Modulus of elasticity E | 86 | 88 | 87 | 86 | 86 | 87 | — | 73 |
| Compact strength (MPa) | | 175 | 172 | 173 | N.D. | N.D. | 170 | — | 157 |

Devitrification resistance: A indicates that no crystals precipitate, B indicates that crystals precipitate on a portion of the surface and C indicates that crystals precipitate on the surface and in the interior.

Initial phase of devitrification: cor—cordierite, ano—anorthite, mul—mullite, cri—cristobalite With respect to the cross sectional shape of the glass fiber, the case when a non-circular cross sectional shape was produced is marked with ○. Here, actually an oval shape was prepared, and the deformation ratio thereof was measured. For the glass of Comparative Example 1, no glass fibers having non-circular cross sections were able to be produced, as marked with x, and hence, for example, the strength as a property of the glass fibers and the strength of a compact were not able to be measured.

In the table, "N.D." indicates that no test was performed, and "-" indicates that no measurement was able to be performed because of the shape of obtained fibers.

As can be seen from Table 2, the glass fibers having oval cross sections of Examples 1 to 6 each have a strength of 4.0 GPa or more and a modulus of elasticity of 85 GPa or more, and each have excellent strength and excellent modulus of elasticity. The fiber-reinforced resin compacts of Examples 1 to 6 each obviously have excellent strength because these compacts were produced by using the glass fibers having oval cross sections.

On the contrary, in Comparative Example 1, the composition of the glass fibers did not include CaO, hence the liquid phase viscosity was low, and accordingly it was impossible to obtain glass fibers having non-circular cross sections.

In Comparative Example 2, the composition of the glass fibers had the content of $Al_2O_3$ and the content of MgO less than the lower limits of the present invention, and hence the strength and the modulus of elasticity of the glass fibers having oval cross sections were lower than the strength and the modulus of elasticity of the glass fibers having oval cross sections of each of Examples 1 to 6. The strength of the fiber-reinforced resin compact of Comparative Example 2 was lower than the strength of the fiber-reinforced resin compact of each of Examples 1 to 6.

Figure 1:
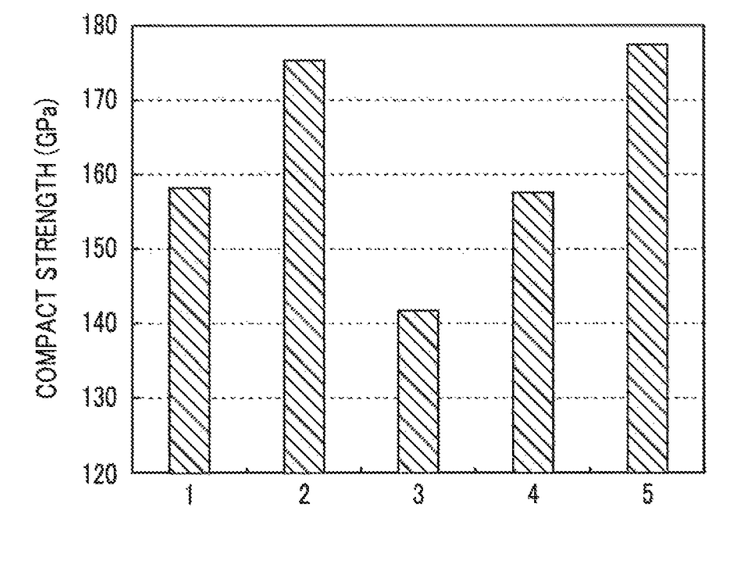
FIG. 1 is a graph for comparing the strengths of the fiber-reinforced resin compacts depending on the types of glass fibers.

Moreover, it is shown that when a fiber-reinforced resin compact is prepared by using the glass fibers of the present invention, a tensile strength comparable with the tensile strength obtained by using S-glass, a high-strength glass can be realized. FIG. 1 shows the results of measuring the tensile strengths of the compacts prepared in the same manner as described above, by using the glass fibers (1, 2) of the present invention, the glass fibers (3, 4) composed of E-glass, and S-glass fibers (5).

Fiber-reinforced resin compacts were produced in the same manner as in Example 1 by using the following glass fibers and the tensile test was performed for each of the produced compacts: circular glass fibers (FIG. 1, 1) and oval glass fibers (FIG. 1, 2) produced with the glass composition of Example 1; circular glass fibers (FIG. 1, 3) and oval glass fibers (FIG. 1, 4) produced with E-glass composition; and circular glass fibers (FIG. 1, 5) produced with S-glass composition which is a high-strength glass composition.

It can be verified that the compact strengths are more increased in the cases where the glass fibers of the present invention were used than in the cases when the glass fibers of E-glass composition were used. It has been revealed that the strength is increased even with the glass fibers (FIG. 1, 1) having circular cross sections, although in a small extent, in the cases when the glass fibers of the present invention were used as compared with the case when the oval E-glass fibers (FIG. 1, 4) were used.

Moreover, when the compact is produced by using the glass fibers having non-circular cross sections using the glass composition of the present invention (FIG. 1, 2), the compact strength comparable with the compact strength obtained with S-glass which is a high-strength glass (FIG. 1, 5) can be realized. This is because the adoption of the non-circular cross section widens the contact area with the thermoplastic resin to increase the strength of the produced compact, as compared with the adoption of the glass fibers having circular cross sections. Although the glass fibers having oval cross sections were used herein as the glass fibers having non-circular cross sections, the contact area can be varied depending on the cross sectional shape of the fibers, and hence it is also possible to further increase the compact strength by regulating the surface area of the glass fibers.

The use of the glass fibers having non-circular cross sections of the present invention allows the high strength of a compact to be achieved. Consequently, with the strength being left as it is, thin wall compacts or fine compacts can be produced, and hence weight saving of compacts can be achieved.

The invention claimed is:

1. Glass fibers having non-circular cross sections, spun from a molten glass prepared by melting a glass composition as a raw material for the glass fibers,
   wherein the glass fibers have a composition wherein a content of $SiO_2$ is 57.0 to 63.0% by mass, a content of $Al_2O_3$ is 19.0 to 23.0% by mass, a content of MgO is 10.0 to 15.0% by mass, a content of CaO is 6.5 to 11.0% by mass, and a collective content of alkali metal oxides $Fe_2O_3$, $TiO_2$, $ZrO_2$, $MoO3$, and $Cr_2O_3$ is less than 0.5% by mass, in relation to a total amount of the glass fibers, and a ratio of the content of MgO to the content of CaO, MgO/CaO falls within a range from 0.8 to 2.0.

2. The glass fibers having non-circular cross sections according to claim 1, wherein the cross section has a flat shape.

3. The glass fibers having non-circular cross sections according to claim 2, wherein the flat shape is a shape selected from the group consisting of an elliptical shape, an oval shape and a cocoon shape.

4. The glass fibers having non-circular cross sections according to claim 1, wherein a crystal precipitating first, when the molten glass is decreased in temperature, is a single crystal of cordierite or a mixed crystal composed of cordierite and anorthite.

5. The glass fibers having non-circular cross sections according to claim 1, wherein in the molten glass, a working temperature range, which is a difference between a 1000-poise temperature and a liquid phase temperature, is 50° C. or more, and a liquid phase viscosity, which is a viscosity corresponding to the liquid phase temperature, is 3000 poises or more.

6. The glass fibers having non-circular cross sections according to claim 1, wherein in the glass fibers, a strength thereof is 4.0 GPa or more and a modulus of elasticity thereof is 85 GPa or more.

7. A fiber-reinforced resin compact formed by mixing and melting glass fibers and a thermoplastic resin and by injection molding the resulting molten mixture, wherein the glass fibers have a composition wherein a content of $SiO_2$ is 57.0 to 63.0% by mass, a content of $Al_2O_3$ is 19.0 to 23.0% by mass, a content of MgO is 10.0 to 15.0% by mass a content of CaO is 6.5 to 11.0% by mass, and a collective content of alkali metal oxides $Fe_2O_3$, $TiO_2$ $ZrO_2$, MoO3, and $Cr_2O_3$ is less than 0.5% by mass, in relation to a total amount of the glass fibers, and a ratio of the content of MgO to the content of CaO, MgO/CaO falls within a range from 0.8 to 2.0, and the glass fibers have non-circular cross sections.

8. Glass fibers having non-circular cross sections, spun from a molten glass prepared by melting a glass composition as a raw material for the glass fibers,
wherein the glass fibers have a composition wherein a content of $SiO_2$ is 58.2 to 60.2% by mass, a content of $Al_2O_3$ is 19.0 to 20.7% by mass, a content of MgO is 10.0 to 12.0% by mass, a content of CaO is 9.0 to 11.0% by mass, and a collective content of alkali metal oxides $Fe_2O_3$, $TiO_2$, $ZrO_2$, MoO3, and $Cr_2O_3$ is less than 0.5% by mass, in relation to a total amount of the glass fibers, and a ratio of the content of MgO to the content of CaO, MgO/CaO falls within a range from 0.8 to 2.0.

* * * * *